United States Patent
Rose et al.

(10) Patent No.: US 6,737,002 B1
(45) Date of Patent: May 18, 2004

(54) FABRICATION OF PLASTIC MODULE WITH EXPOSED BACKSIDE CONTACT

(75) Inventors: James Wilson Rose, Guilderland, NY (US); Donald Leroy Lester, Ballston Lake, NY (US); Christopher James Kapusta, Duanesburg, NY (US); Paul Alan McConnelee, Schenectady, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 56 days.

(21) Appl. No.: 10/067,077

(22) Filed: Feb. 4, 2002

(51) Int. Cl.[7] ............ B29C 45/14; B29C 70/70
(52) U.S. Cl. ............ 264/40.1; 264/157; 264/161; 264/254; 264/263; 264/272.14; 264/272.15; 264/272.17
(58) Field of Search ............ 264/40.1, 138, 264/157, 161, 254, 272.14, 272.15, 272.17, 275, 277; 29/827, 829, 841; 438/126, 127

(56) References Cited

U.S. PATENT DOCUMENTS

| | | | | |
|---|---|---|---|---|
| 5,041,395 A | * | 8/1991 | Steffen | 29/827 |
| 5,492,586 A | * | 2/1996 | Gorczyca | 156/245 |
| 5,577,319 A | * | 11/1996 | Knecht | 29/827 |
| 5,640,746 A | * | 6/1997 | Knecht et al. | 29/25.35 |
| 5,778,529 A | * | 7/1998 | Beilin et al. | 29/852 |
| 6,344,162 B1 | * | 2/2002 | Miyajima | 264/272.14 |
| 6,399,004 B1 | * | 6/2002 | Slager | 264/254 |

* cited by examiner

*Primary Examiner*—Angela Ortiz
(74) *Attorney, Agent, or Firm*—Duane Morris LLP (57) ABSTRACT

A chip-on-flex HDI module is fabricated by dispensing encapsulant material onto the components of a populated dielectric film or sheet in an interrupted pattern which leaves the backsides of selected components free of encapsulant. The dispensing is accomplished by relative motion of the dispenser tip and the populated film, with the dispenser tip at a height slightly above the desired liquid fill height during dispensing. At the locations of the components which are to be free of encapsulant, the dispensing stops, and the tip may be raised to prevent residual viscous matter on the dispenser tip from contacting the backside of the exposed component.

15 Claims, 8 Drawing Sheets

FABRICATION OF PLASTIC MODULE WITH EXPOSED BACKSIDE CONTACT

FIELD OF THE INVENTION

This invention relates to fabrication of high-density interconnect (HDI) electric or electronic modules, and more particularly to arrangements for encapsulating the components of modules in which at least one of the components requires connections to the "back" side opposite to that side of the component bearing an array of electrical connection pads.

BACKGROUND OF THE INVENTION

High density interconnect (HDI) modules are modules which take advantage of the high circuit densities of semiconductor or solid-state chips (dies) or integrated circuits (or other components), by allowing many chips to be mounted close together on a planar surface, with a multilayer interconnect structure overlying the connection sides of the chips to provide the electrical interconnections which allow interaction of the chips to generate complex systems.

In the past, HDI modules have been fabricated by defining a plurality of wells in a ceramic substrate, and mounting the chips in the wells with the planes of their connection pad arrays aligned. A dielectric film or sheet is laminated over the connection pads of the chips, following which through vias are laser-drilled to those connection pads to which connection is to be made. A pattern of electrically conductive metal is deposited over a portion of the exposed dielectric film and into the vias to make connection to the underlying chip contacts. Additional layers of interconnect are made in much the same manner, thereby providing electrical conducting paths between and among the chips sufficient for assemblages of any complexity, and suitable for high-frequency operation. Where an electrical connection to the backside of a die is desired, this has been provided by patterning metal traces on the ceramic substrate, and bonding the die to the underlying metal with a conductive adhesive.

A more recent method for fabricating such modules is the "chip-on-flex" method, in which a dielectric film is mounted to a supporting frame under tension. The film may be patterned on either or both sides with layers of electrically conductive circuit paths of the interconnect circuitry. The dielectric film is then coated with an adhesive layer, and used as the bonding surface onto which the chips of the array of modules are attached, with their connection pads facing the dielectric film. After bonding the die to the dielectric film, a region containing the array of modules is defined by a metal collar, and the region within the collar is filled with granular encapsulant material. The granular encapsulant material is cured by heating, which melts and cures the encapsulant. Additional interconnection layers can then be applied to thereby complete the desired individual modules. The completed modules are then physically separated from each other by a dicing process, such as a wafer saw or by use of a laser. While it is possible to separate the modules from each other at any time after the encapsulant material is cured, it is preferable to add any additional interconnection layers prior to any dicing step.

While the chip-on-flex method provides several advantages over the prior HDI process, the encapsulation method has several shortcomings. The encapsulation process forms a uniform thickness of encapsulant material across all the modules due to its liquid state prior to cure. This uniform thickness fully encapsulates all embedded components. Electrical connection(s) to the backside of a die through the encapsulant are not possible. Previous efforts to address this issue have involved partial removal of cured encapsulant material to expose the backsides of the components, as for example by milling or ablating the cured material exclusively in the region of selected chips. This procedure is difficult, since the exact positions of the chips are typically not visible during the milling or ablating. If the entire module is lapped or ground, the backsides of the components will be subjected to shearing forces which may damage the components. In addition, all components of the thickness to which the module is ground will be exposed, including components for which full encapsulation is desired.

Another shortcoming of the chip-on-flex method is that the encapsulation material, when applied to encapsulate an area which is several times larger than that of a discrete module, has the undesired tendency to distort the underlying dielectric film andor to stress the chips. The distortion makes further processing difficult, and the stresses tend to reduce the reliability of the resulting module.

Improved chip-on-flex encapsulating methods are desired.

SUMMARY OF THE INVENTION

A method according to an aspect of the invention for molding multichip modules in such a manner as to allow backside contact includes the step of procuring a tensioned dielectric film or sheet populated with components having electrical contacts adjacent the film and also having at least one of a backside thermal contact and a backside electrical contact. One or more module region(s) is/are defined by dispensing a high-viscosity liquid dam material around those components included within a single module. The dam defines exterior dimensions substantially equal to the finished size of the module, unless trimming steps are added. At least a portion of the dammed region is filled with liquid encapsulant material by use of an programmed automatic dispenser apparatus which relatively moves a dispenser tip or nozzle along a preprogrammed path within the module region. In one version of the invention, the automatic dispenser apparatus is controlled to define a dispenser or dispensing path which in plan view (a) begins dispensing near the geometric center of the module region, and continues dispensing in a generally spiral overall pattern, so that, in the absence of components requiring backside contacts, the entirety of the dammed region is covered or filled with encapsulant, (b) stops the dispensing in those regions occupied by those of the components for which backside contact is desired. In one mode of the method, the dispenser tip is maintained at a fixed height during dispensing. In another mode of the invention, the controlling step includes the further step of (c) raising the dispenser tip and stopping the dispensing at any components which are not to be encapsulated, or which are to have their back sides clear of encapsulant material. In a further version of the method, the step of defining a module region includes the step of dispensing the encapsulant in high-viscosity form. In another variant, additional dammed regions may be introduced within the bounds of a given module, to thereby define unencapsulated regions. These unencapsulated regions may be populated or unpopulated.

DESCRIPTION OF THE INVENTION

In general, according to an aspect of the invention, the tendency to distort occasioned by the prior-art chip-on-flex fabrication is ameliorated by placing a dam around each module's worth of components (i.e. the finished dimensions), rather than enclosing multiple modules' footprints, and filling the region within each dam with a hardenable liquid encapsulating material. When the encapsulating material has hardened or set, and possibly after further HDI processing steps such as the application of interconnect layers, the modules are separated, and possibly trimmed to finished size. It should be noted that the dam is made from encapsulant material having a greater viscosity than the encapsulant fill material, so that the dam, while still in an uncured state, will limit the flow of the encapsulant or fill material. This allows the dam to be applied and the defined area to be filled in consecutive operations, which in turn allows the materials to be cured simultaneously or concurrently. The separation of the encapsulant material into sections, each of which covers only one module's worth of components, tends to alleviate the distortion problem, because the maximum stress is proportional to size of the encapsulated region. Various curing techniques are available to aid in reducing distortion.

Figure 1A:
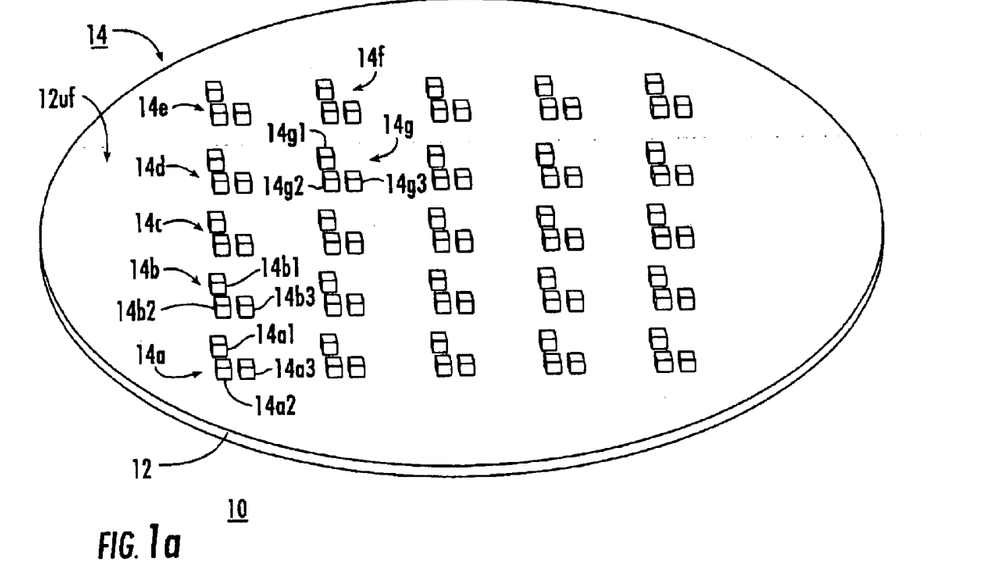
FIG. 1a is a simplified perspective or isometric view of a tensioned dielectric film or sheet populated with the components of a plurality of multi-chip modules.

In FIG. 1a, a tensioned populated dielectric film or sheet 10 includes a dielectric film 12 under tension, as may be provided by a conventional frame (not illustrated). Dielectric film 12 may bear conductor patterns and fiducial markings indicating the locations at which the various components are to be placed. An array 14 of a plurality of chip-sets or component groupings 14a, 14b, 14c, 14d, 14e, 14f, 14g, . . . is bonded to the upper surface 12uf of dielectric film 12, as by the use of adhesive. Each chip set or component grouping of set 14 includes three illustrated components. The components making up chip set or component grouping 14a are designated 14a1, 14a2, and 14a3. Similarly, the components making up chip set 14b are designated 14b1, 14b2, and 14b3. The other chip sets may be considered to have equivalent designations. Thus, components making up chip set 14g are designated 14g1, 14g2, and 14g3.

Figure 1B:
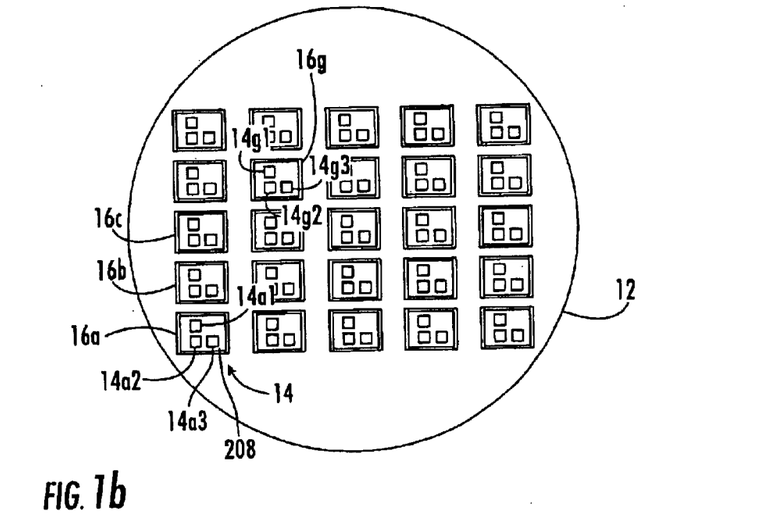
FIG. 1b is a plan view thereof, showing the locations of the dams used during a portion of the processing.

FIG. 1b is a plan view of the populated dielectric film 10 of FIG. 1a, with the locations of dams shown in relation to each set of components. In FIG. 1b, components 14a, 14b, and 14c constitute a chip-set 14a, which is associated with one multichip module, designated as 15. Chip-set 14a of components is surrounded by a dam designated 16a. Dam 16a defines a dammed region 208, and also by its outer dimensions defines the dimensions of a single multichip module. Similarly, components 14b1, 14b2, and 14b3 constitute chip-set 14b, which is associated with one multichip module. Dam 16b surrounds set 14b of components, and by its outer dimensions defines the extent of a single multichip module. The remaining sets of components may be considered to be similarly arranged, with set 14c of components surrounded by a dam 16c. Components 14g1, 14g2, and 14g3 constitute a chip-set 14g, which is associated with one multichip module. Dam 16g surrounds chip-set 14g of components, and by its outer dimensions defines the extent of a single multichip module. It will be noted that the walls of the dams which define the dimensions of the various multichip modules are not in contact with each other. That is to say, for example, that dam 16a is not in contact with dam 16b. The dams may be made by use of an automated dispensing machine, which includes one or more dispenser tips or nozzles which are controlled as to their 3-axis Cartesian tool path, and which are also controlled as to acceleration, velocity, and flow rate. These automated dispensing machines are standard pieces of equipment, which are in current use for dispensing encapsulant materials. The encapsulant material may be a liquid polymer such as HYSOL FP4651 manufactured by Dexter Corporation of Windsor Locks, CT. As mentioned, the material dispensed to define the dams may be similar to the encapsulant material, but with a higher viscosity. Encapsulant HYSOL FP4452 is more viscous than HYSOL FP4651.

Following the definition of the dams 16a, 16b, 16c, . . . 16g in FIG. 1b, the encapsulation step begins. The encapsulation is accomplished by dispensing lower-viscosity liquid encapsulant material (that is, lower viscosity than the material used to define the dams) within the confines of the various dams, to thereby encapsulate the components of each multichip module. After all of the encapsulation is accomplished on the dielectric film 12, the encapsulant materials are cured. Other standard HDI processing steps can then be used to define the interconnects among the chips of each multichip module on dielectric film 12. When all the interconnect processing is completed, the multichip modules can be separated from each other for final processing.

It may be desired to encapsulate all of the components of a multichip module, except particular components to which backside connections are desired. The abovedescribed fabrication method fills the dam to a given level, which means that components having their backsides extending further than (that is, above) the level of the hardened liquid encapsulant will not be encapsulated, and also means that components having backsides which do not reach the surface of the hardened liquid encapsulant will necessarily be covered. Where a planar module is desired, the problem of insufficient encapsulation is easily remedied by matching the height of the dam and the encapsulant to the highest component.

According to an aspect of the invention, the liquid encapsulant for each multichip module is dispensed within the dam by a programmed automatic dispenser, which moves a dispenser tip over the surface to be encapsulated in a complex pattern at programmable height, and with controlled encapsulant flow rate. Dispensing machines for performing such controlled deposition are available, and are available as MRSI-170G manufactured by MRSI-Group of N Billerica, Mass., and as Asymtek M-620, manufactured by Asymtek, Inc., of Carlsbad, Calif. According to the invention, the dispensing machine is programmed to dispense encapsulant in a roughly spiral pattern over the entire surface to be encapsulated, and is also programmed not to dispense while positioned over a component to which backside contact is desired. In a particularly advantageous method, the programming also lifts the dispenser tip in the proximity of such components.

Figure 2:
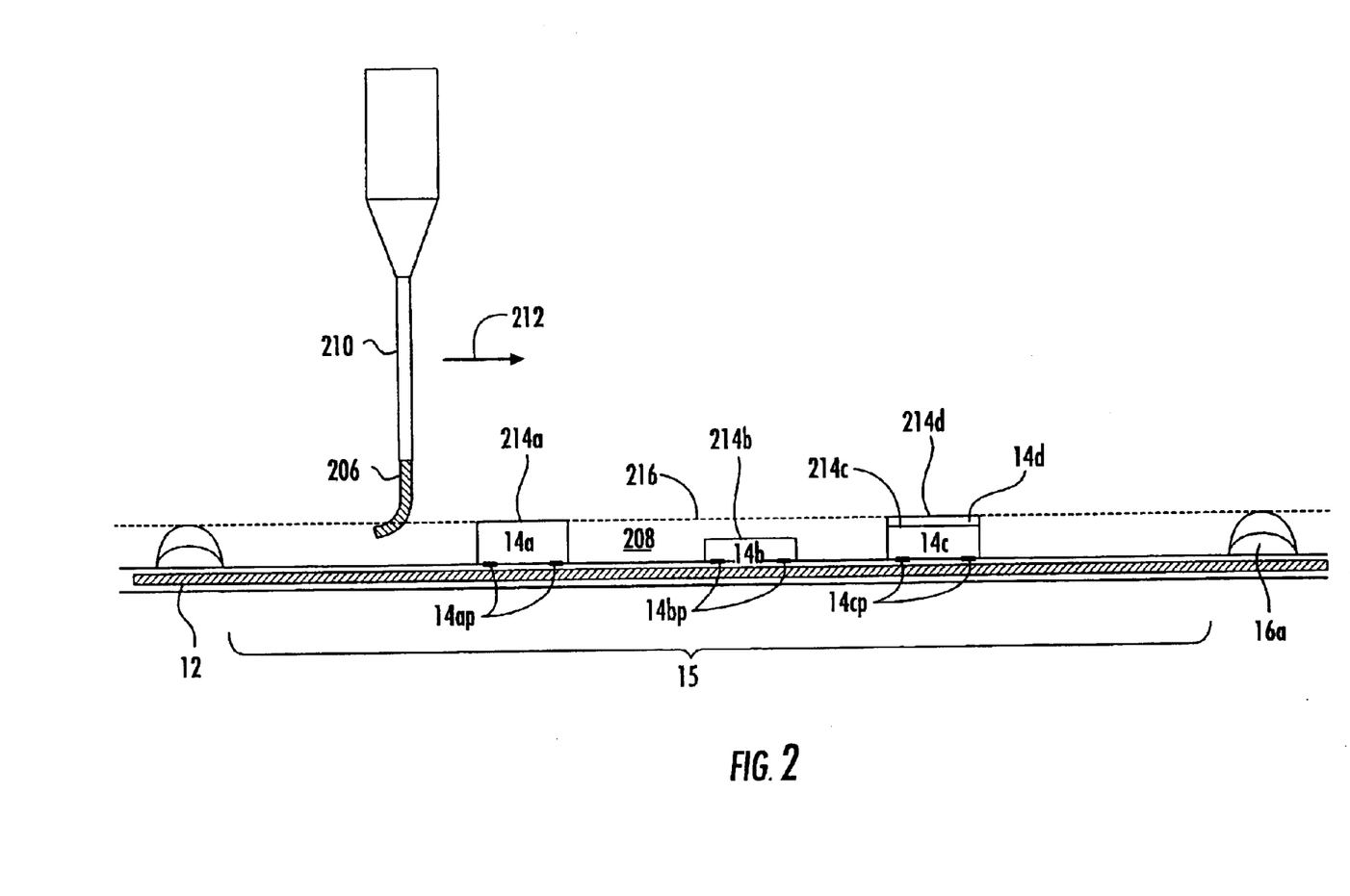
FIG. 2 is a simplified cross-section of a portion of one module of FIG. 1a or 1b, illustrating how a liquid encapsulant dispensing nozzle moves across the surface, and also illustrating component height and liquid encapsulant nominal fill height.

FIG. 2 is a simplified cross-sectional view of a populated dielectric film such as that of FIG. 1b in a region within one multichip module, which is to say within the confines of one dam, such as 16a. In FIG. 2, the dielectric film is 12, and the illustrated components are 14a, 14b, and 14c. The dispenser tip is designated 210, and its short-term direction of motion is indicated by arrow 212. Dam wall 16a is seen in cross-section. Ideally, the dam is built up by dispensing material during two or more passes of the dispensing tip, so as to tend to increase the cross-sectional aspect ratio (the ratio of dam height to its width). The height of dam 16a is set to the anticipated fill level 216.

The dispensing rate of dispenser tip 210 is set to fill the region to the level indicated by dash line 216 in the absence of any further control. In general, this means that the dispensing rate, in the absence of any further control such as that described below, would on successive passes fill the region to the level of dashed line 216. More particularly, the encapsulant dispense rate equals the total volume of encapsulant material divided by the total time the dispense pump is operating. The encapsulant volume is the product of the module area and desired encapsulant depth, less the volume of the encapsulated components. The pump time is calculated by dividing the length of the dispenser tool path by the programmed dispenser tip velocity. The effect of controlling dispensing rate is that, in the absence of any additional control, the region would be filled to the level indicated by dash line 216 of FIG. 2.

As illustrated in FIG. 2, the components 14a, 14b, and 14c are placed on dielectric film 12 with their electrical connection pads 14ap, 14bp, and 14cp, respectively, facing the dielectric film 12. The height of backside 214a of component or chip 14a lies at the fill level 216, while the heights of backsides 214b and 214c of components or chips 14b and 14c, respectively, lie below fill level 216. Component 14c has a backside connector 14d which extends above the backside 214c to the fill level 216. Clearly, component 14b will be fully encapsulated, since it lies below the level of the liquid encapsulant. If it is desired to make backside contact to components 14a and 14c, the backsides 214a and 214c should be kept free from encapsulant material. If dispenser tip 210, moving in direction 212, dispenses encapsulant material as it traverses components 14a and 14c, encapsulant material will be applied to the backsides 214a and 214c. If the liquid encapsulant were without surface tension, it might run off the backsides and into the main portion of the liquid encapsulant. However, the viscosity and surface tension are such that the material cannot be relied upon to run off the backsides, and some may remain. According to an aspect of the invention, the flow rate is at least reduced, and preferably stopped, during those periods in which the dispenser tip lies over the backside(s) which is(are) to be kept clear.

According to another aspect of the invention, the dispenser tip is maintained at a base height which lies slightly above the nominal fill level 216 during ordinary dispensing. The tip is maintained about 0.020 inch above the nominal fill level in one method according to the invention.

Figure 3:
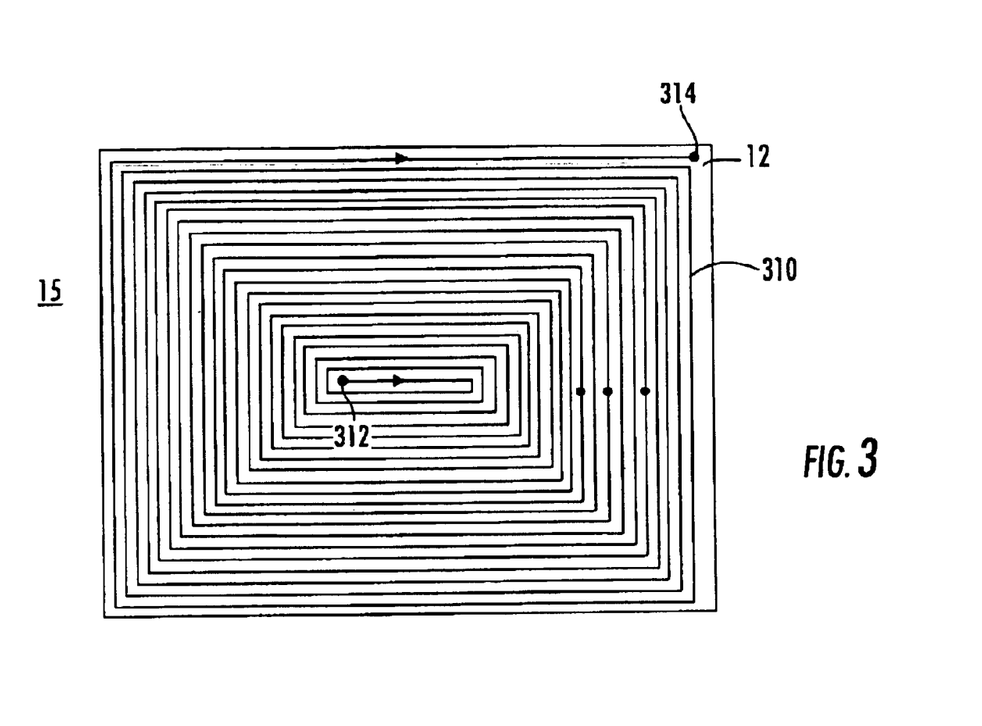
FIG. 3 is a simplified plan view of a module with no components shown, which is to be encapsulated, illustrating a "spiral-out" dispenser nozzle path or trajectory which may be determined from the geometry of the module.

FIG. 3 illustrates a "spiral-out" basic dispensing tool path, track or pattern which is followed or imposed on the dispenser tip 210 during dispensing of liquid encapsulant according to an aspect of the invention. In FIG. 3, the dielectric film 12 to be encapsulated in module 15 is illustrated as being free from components. The origin 312 of the dispensing tool path can be determined from the dimensions of the module 15. The origin 312 in the case of a rectangular module is located on the centerline of the long axis of module 15, offset from the midpoint by one-half of the difference between the length and width of the module. From the origin 312, the path traverses the geometric center of the module to an equidistant point along the centerline, and then proceeds in a generally clockwise rectangular-spiral pattern from location 312 over the film 12, until the dispensing is stopped at a location 314 near the outer edge of module 15. The pitch of adjacent turns of the spiral may be selected to match the radius of the dispense tip. The spiral-out pattern has the advantage that the dispensing pattern generally matches the natural outward flow of the fill material as it is dispensed. This results in better uniformity and less entrapped air than in other approaches.

Another advantage of the spiral-out dispensing pattern is that it facilitates automatic compensation for the presence of components, especially misaligned or non-rectangular components. Alternative approaches may be more difficult to modify for such misaligned or nonrectangular components.

Those skilled in the art will recognize that a preprogrammed dispensing tool path may be used, so long as the components may be guaranteed to occupy their nominal positions. Additional techniques, such as the use of automated optical or visual recognition must be used to determine the presence of component or die misalignment and to generate a unique dispensing pattern for each module containing misaligned dies or components.

Figure 4:
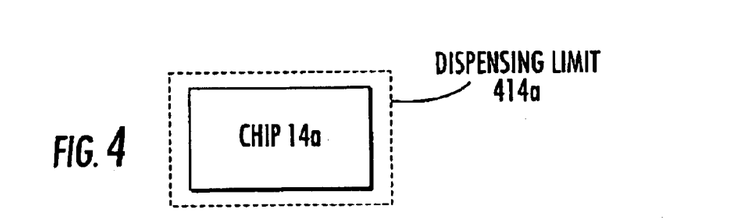
FIG. 4 is a simplified plan-view representation of a rectangular component which might be placed in or on the surface of FIG. 3, together with the dispensing limit line(s) associated with the component.

FIG. 4 is a plan view of a rectangular die (chip) or component designated 14a, together with a surrounding dash line 414a which is the boundary or limit representing the closest approach of a dispenser tip to the edge of the component. For the case of a circularly cylindrical dispenser tip, the dispensing boundary or limit 414a is defined by the radius of the bead of encapsulant fill material, which is typically the outer radius of the tip. Each component requiring backside contact will have its own dispensing boundary equivalent to 414a of FIG. 4.

Figure 5A:
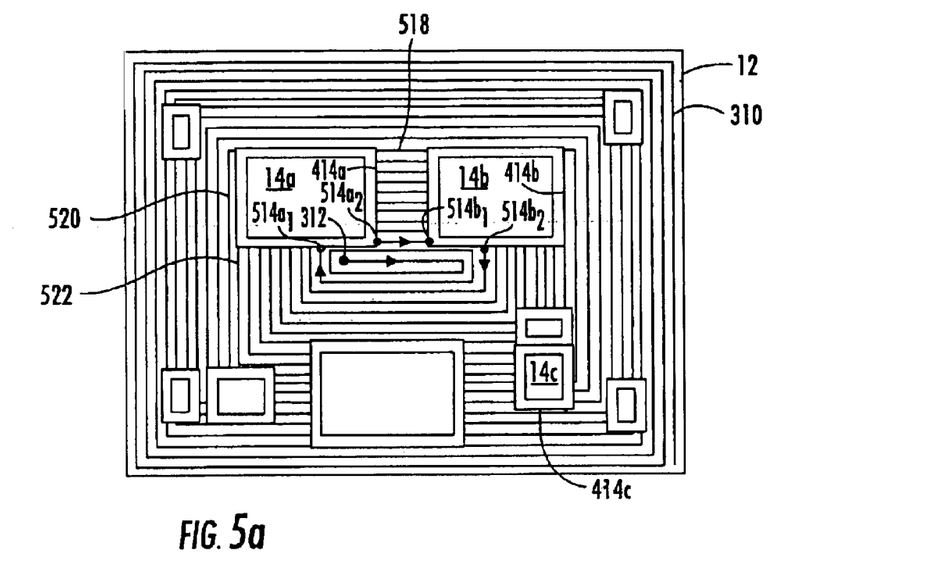
FIG. 5a is a simplified plan representation of the surface of FIG. 3 with a plurality of rectangular components of various sizes placed thereon, showing the resulting interrupted spiral-out dispensing pattern or trajectory.

FIG. 5a is a simplified plan view illustrating a dielectric film or sheet 12 populated with rectangular components, with the underlying dispenser tip spiral-out pattern overlain by the various components. In FIG. 5a, some of the components requiring backside contact are designated 14a, 14b, and 14c. Each component 14a, 14b, and 14c, and other like components illustrated in FIG. 5a, are surrounded by a solid line representing the dispensing boundary for that particular component. Thus, in FIG. 5a, component 14a has a surrounding dispensing boundary represented by a solid line 414a, Similarly, components 14b and 14c have surrounding dispensing boundaries designated 414b and 414c, respectively. Other components have corresponding dispensing boundaries, which are not separately designated. As illustrated in FIG. 5a, the spiral dispensing path 310 breaks at each dispensing boundary, and dispensing does not begin again until the tip passes over the "other" side of the boundary. Thus, the dispensing path is an interrupted spiral. For example, the spiral dispensing path, which begins at origin or location 312, proceeds in the direction of the arrow, and first arrives at location 514a1 at the dispensing boundary 414a of component 14a. At location 514a1, the dispensing stops. The dispenser tip is repositioned to location 514a2, corresponding to the intersection of dispensing limit 414a with the original spiral tool path. The dispenser tip continues dispensing in that portion of the underlying spiral path extending from location 514a2 to the next chip dispensing limit which it reaches, which is location 514b1. Dispensing stops, and the dispenser tip is repositioned to location 514b2, corresponding to the intersection of dispensing limit 414b with the original spiral tool path. At location 514b2, the dispensing begins again as the dispenser tip resumes the spiral path outward from location 514b2. It should be noted that the tool path during repositioning may be performed as a continuation of the original spiral tool path, if desired.

Figure 5B:
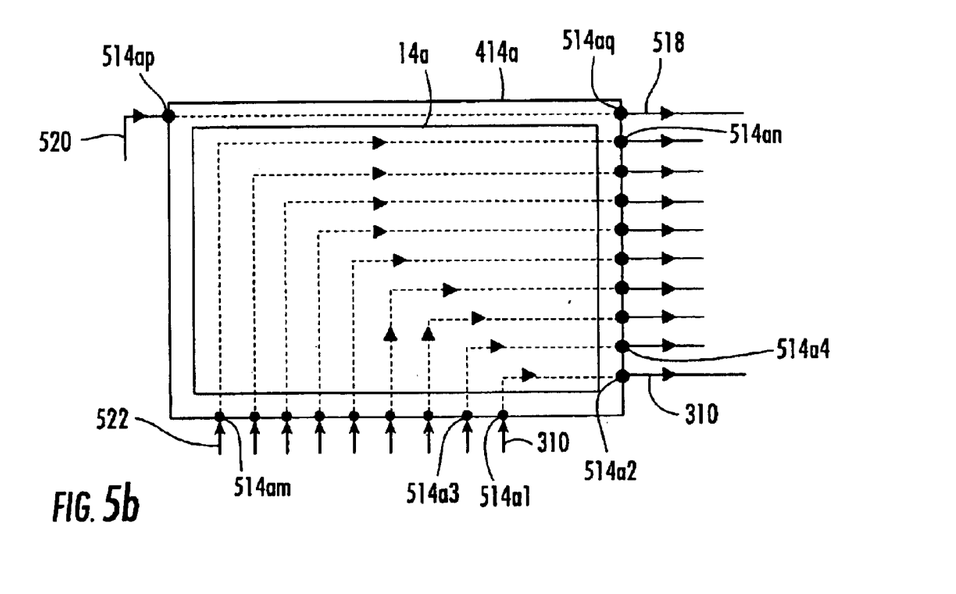
FIG. 5b is an enlarged view of a portion of the representation of FIG. 5a, showing details of the dispenser nozzle tool path in non-dispensing regions.

FIG. 5b is an enlarged view of chip 14a of FIG. 5a, illustrating some details of the dispensing path. In FIG. 5b, path 310 arrives at dispensing boundary 414a from below, and dispensing stops at location 514a1. The tip is repositioned (as by continuing the spiral path) from location 514a1 to location 514a2 without dispensing, and dispensing begins again at location 514a2. During the next turn of spiral, the dispensing path arrives from below at location 514a3, and dispensing stops as the tip is relocated, or follows the spiral path, to location 514a4. Dispensing begins again at location 514a4. This pattern repeats, with the spiral path becoming bigger and bigger, until that portion of the spiral path designated 522 arrives at the dispensing boundary 414a of chip 14a at location 514am. Dispensing stops as the tip is repositioned from location 514am to location 514an. At location 514n, the dispensing begins again. During the next turn of spiral, the dispenser tip clears the left edge of the dispensing boundary 414a during its upward traverse 520, and dispensing stops only at the left edge of dispensing boundary 414a at location 514ap, for so long as it takes for the dispenser tip to reach location 514aq. Thus, the continuous underlying spiral path illustrated in FIG. 3 is modified, with the dispensing taking place in an "interrupted spiral" at locations which do not overlie selected components or their dispensing limits. It should be emphasized, however, that the dispenser tip may continue to dispense over any chips or components to which backside connections are not desired.

Figure 6:
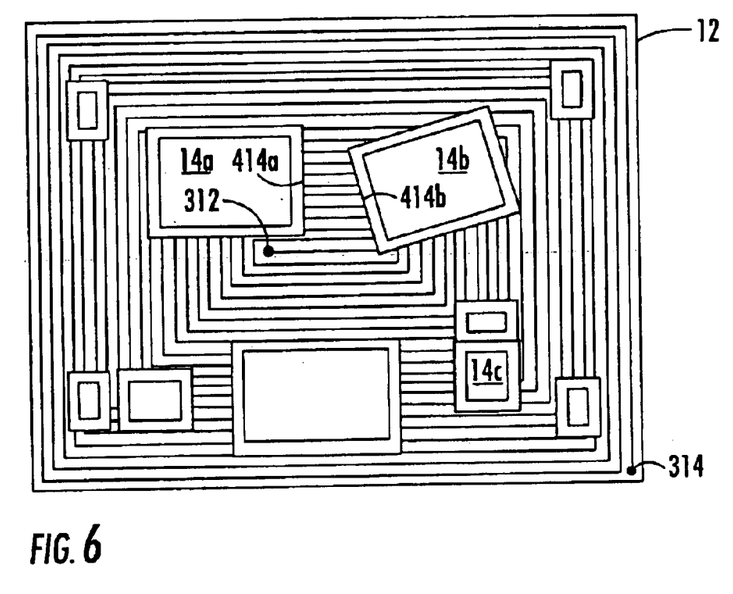
FIG. 6 is a simplified diagram similar to that of FIG. 5a, with one of the components misaligned, showing the resulting interrupted spiral-out dispenser nozzle tool path.

FIG. 6 is similar to FIG. 5a, but illustrates how the dispensing pattern may be adjusted to accommodate a misaligned die. More particularly, rectangular component or die 14b is misaligned relative to its intended position as illustrated in FIG. 5a. The various dispensing paths between the dispensing limit 414a and 414 vary in length so as to provide proper filling with encapsulant in the non-component regions. As mentioned, the accommodation of misaligned dies may require a vision system.

Figure 7:
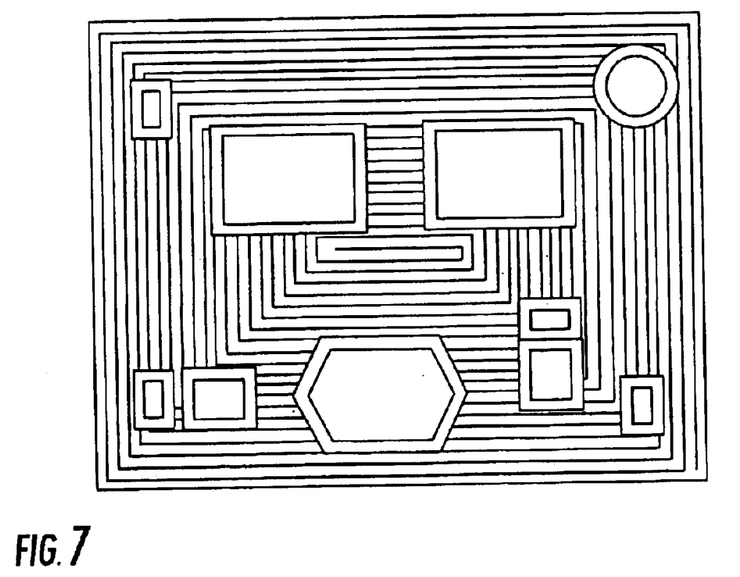
FIG. 7 is a simplified diagram similar to that of FIG. 5a or FIG. 6, in which various ones of the components are nonrectangular.

FIG. 7 is similar to FIG. 5a, but shows the use of dice or components having nonrectangular shapes. As in the case with misaligned die, the various dispensing paths of the spiral-out pattern adjust in length between mutually adjacent dispensing limits to fill the non-component regions.

Figure 8:
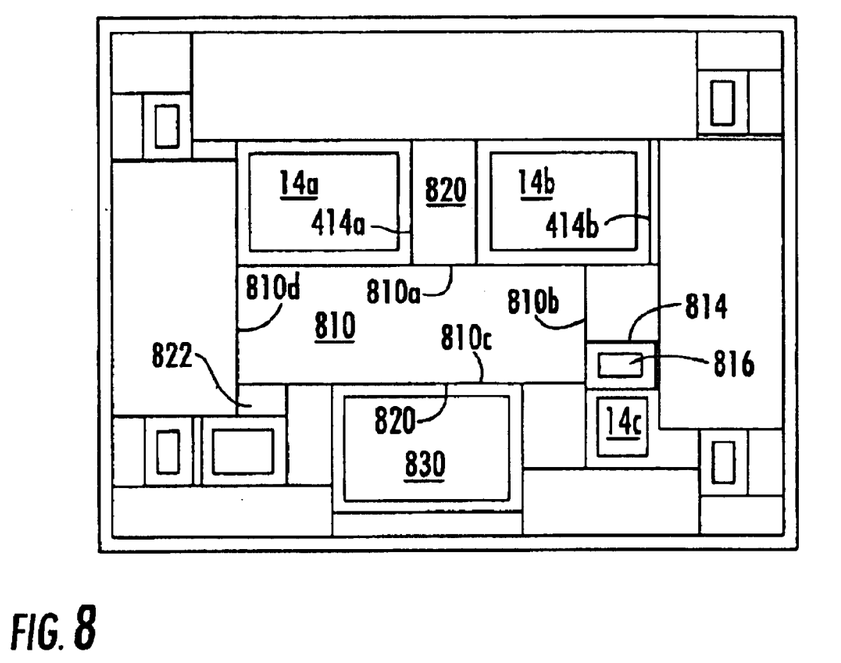
FIG. 8 is a simplified diagram generally similar to FIG. 5a, in which the non-component region is divided into plural rectangular mosaic elements.

Dispensing patterns other than the spiral-out pattern are possible. One such pattern is a spiral-in pattern. Another possible pattern is an "interrupted-boustrophedonous" path, which is an overall raster-scan path in which dispensing occurs in a right-to-left, left-to-right (or top-to-bottom, bottom-to-top) path, and is interrupted at the locations of the components to which backside connections are desired. Another possible pattern is a mosaic pattern, in which the surfaces to be covered with encapsulant are conceptually broken into rectangular regions, which can then be individually filled with encapsulant using either the spiral or raster-scan approaches. The mosaic portions are illustrated in FIG. 8. More particularly, one mosaic portion is designated 810, and has one border 810a which lies along the dispensing limit 414a and 414b of components 14a and 14b. Another border 810b of mosaic region 810 is a straight line which lies along the dispensing limit 814 of a component 816. A third border 810c of mosaic region 810 is parallel with border 810a, and is congruent, at least in part, with the dispensing limit 820 of a component 822. The fourth border of mosaic region 810 is designated 810d, and lies parallel with border 810b, and in-line with the dispensing limit 414a of component 14a. Other rectangular mosaic regions are similarly defined to cover that portion of the surface which is not occupied by components. Each mosaic region, such as mosaic regions 810, 820, and 830, is independently filled with encapsulant material by any of the dispensing patterns. Naturally, this independent filling may be accomplished in time sequence, by first filling region 810, then region 820, then region 830. It is preferable to fill the various mosaic element in a pattern which applies the encapsulant to mutually adjacent regions so as to avoid the problem of entrapment of air due to liquid encapsulant flow from disparate directions, which entrapment, were it to occur, might produce weak spots in the cured encapsulant.

Figure 9:
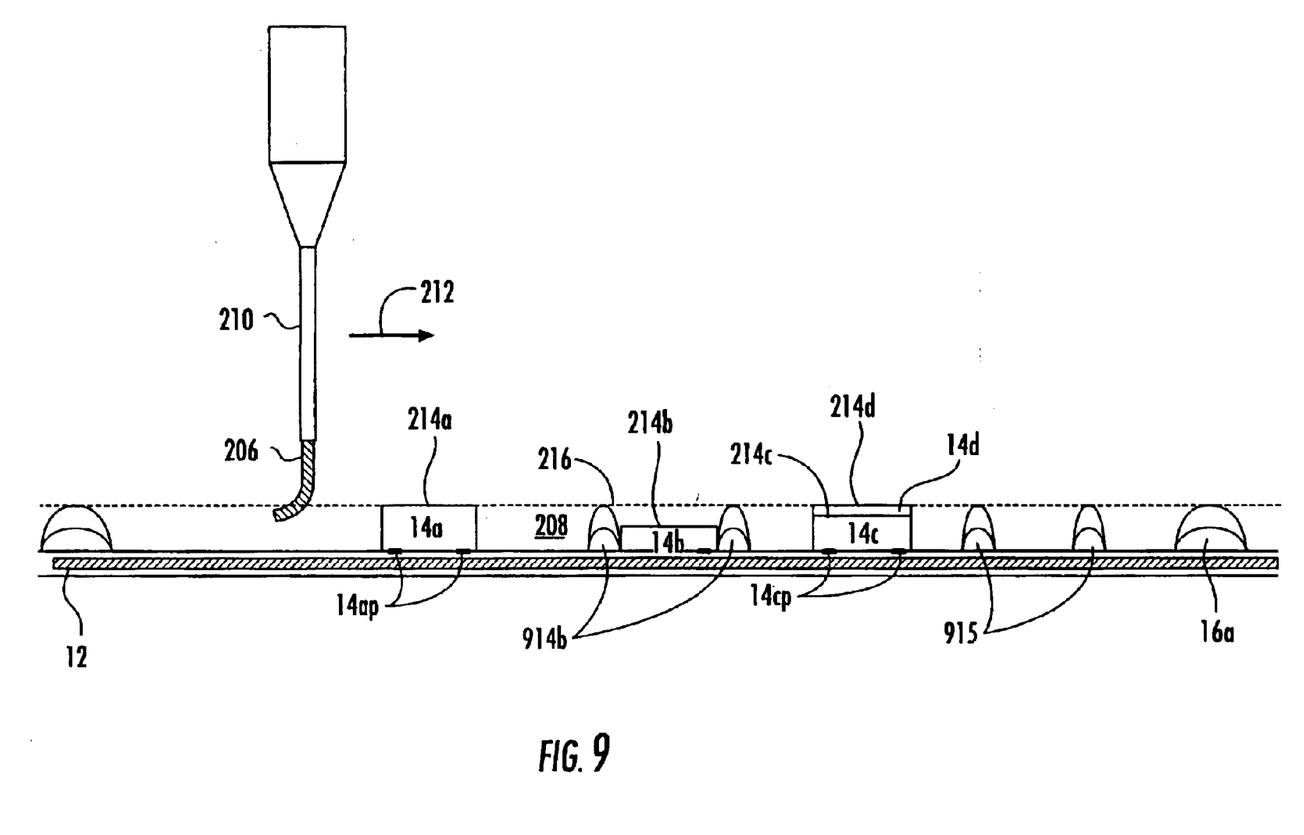
FIG. 9 is a cross-section similar to that of FIG. 2, in which additional dam regions internal to the module are defined.

In some instances, it may be desirable to place either a component or a backside connector on a component following encapsulation andor subsequent HDI processing. Such a situation might arise due to incompatibility between a component or connector and the temperatures or chemicals to which such devices would be exposed during processing. It may also be desirable to reserve a location within the volume of a module, to be populated after processing with either a customized device, such as a tuning crystal, or with a disposable device, such as a battery. According to an aspect of the invention, additional dams are defined within the module before the encapsulant fill material is dispensed. FIG. 9 is a cross-sectional view similar to that of FIG. 2, but in which component 14b has a dam 914b dispensed around the edges of the component, which dam extends to the desired fill level 216. In FIG. 9, a further dam 915 is illustrated as being dispensed on dielectric film 12, and also extends to the fill height 216 of the liquid fill material. The internal dams 914b and 915, in conjunction with the interrupted encapsulant dispensing patterns described in conjunction with FIGS. 5a, 5b, 6, 7, and 8, prevent encapsulant material from being introduced into selected portions of the module, namely those portions within the boundaries of dams 914b and 915. Thus, thin components and unpopulated regions may be kept free of encapsulation.

Figure 10:
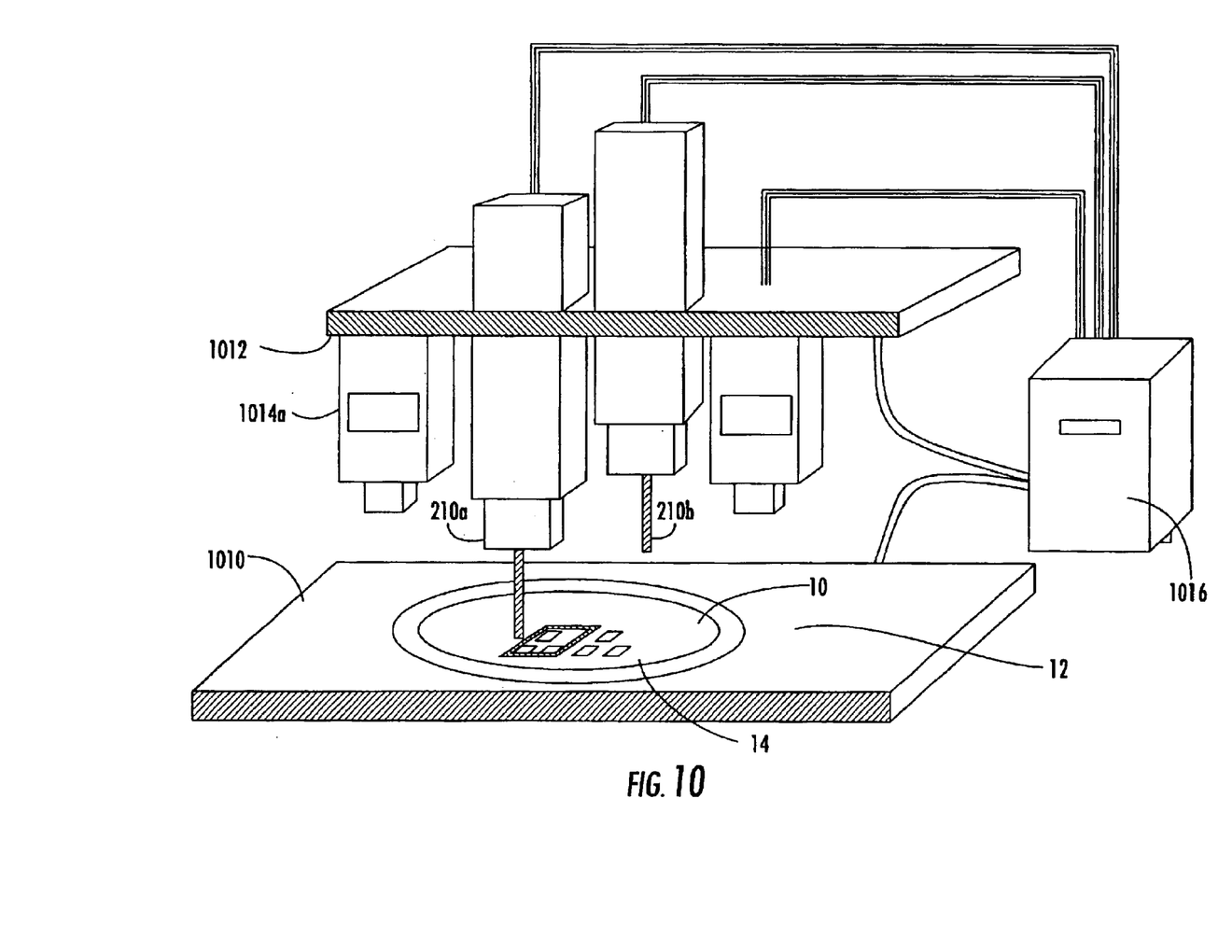
FIG. 10 is a conceptual illustration of an automatic encapsulant dispensing apparatus with a processor for following a preprogrammed dispensing path or for adapting the path in the presence of component misalignment.

FIG. 10 conceptually illustrates an automatic encapsulant dispensing machine 1000. In FIG. 10, the machine includes a holder or platform 1010 for the tensioned populated dielectric film 10 of FIG. 1, and also shows a support 1012 for movable dispenser tip 210. A plurality of cameras, designated 1014a and 1014b, view the tensioned populated dielectric film workpiece, and produce images which can be used by a processor 1016 to verify the locations of the various dice on the dielectric film 12, and to control the location of the dispenser tips 210a and 210b in Cartesian x, y, and z axes. Alternatively, the holder 1010 could be movable and the dispenser tips fixed, or both can be movable simultaneously to thereby accomplish complex motions.

Following the dispensing of the encapsulant material, the polymer encapsulants are cured by preheating to 50° C. to lower or reduce the viscosity of the fill encapsulant and thereby free any entrapped air. The populated film with components and encapsulant is pulled against a flat plate by a vacuum, and cured for 15 minutes at 100° C., then 30 minutes at 125° C., then 30 minutes at 150° C., with a final cure of 90 minutes at 165° C. The vacuum curing is desirable to maintain the dimensional stability and planar nature of the module.

Following the curing, each finished module may be cut or otherwise removed from the populated dielectric sheet, and trimmed to proper size, if necessary. The cutting may be performed in such a manner that the finished size of each module is substantially equal to the exterior dimensions of the dam associated with that module. The cutting may also be performed in a manner which makes the finished dimensions of each module smaller than the exterior dimensions of the surrounding dam. If desired, the separated module may further be trimmed to final size. Cutting and trimming operations are well known, and are not illustrated.

Other embodiments of the invention will be apparent to those skilled in the art. For example, the dispense tip can be raised in conjunction with the cessation of dispensation in order to reduce or prevent "tailing." This motion may be performed in conjunction with a further step of momentary movement of the tip in a reverse or retrograde direction in order to assure that the "tail" of the dispensed encapsulant bead falls over an encapsulated region, and not onto a region where encapsulation is not desired.

Thus, a method according to an aspect of the invention is for molding multichip modules (14, 15) in such a manner as to allow backside (214a, 214b, 214d) contact includes the step of procuring a tensioned dielectric film or sheet populated (12) with components (14) having electrical contacts (14ap, 14bp) adjacent the film (12) and also having at least one of a backside (214a, 214b, 214d) thermal contact and a backside electrical contact. One or more module (15) region(s) is/are defined by dispensing a high-viscosity liquid dam material (16a) around those components (14a1, 14a2, 14a3) included within a single module (15). The dam (16a) defines exterior dimensions substantially equal to the finished size of the module (15), unless trimming steps are added. At least a portion of the dammed region (208) is filled with liquid encapsulant material (206) by use of an programmed automatic dispenser apparatus (1000) which relatively moves a dispenser tip (210) along a preprogrammed path (310) within the module region. The automatic dispenser apparatus (1000) is controlled to define a dispensing path which in plan view (a) begins dispensing near the center (312) of the module region (14a), and continues dispensing in a generally spiral overall pattern (FIG. 3), so that, in the absence of components requiring backside contacts, the entirety of the dammed region (208) is covered or filled (to level 216) with encapsulant, (b) stops the dispensing in those (component) regions occupied by those of the components (214a, 214c, 214d) for which backside contact is desired. In one mode of the method, the dispenser tip (210) is, during dispensing, maintained at a fixed height (0.020 inches) above the desired fill level). In another mode of the invention, the controlling step includes the further step of (c) raising the dispensing tip (210) to clear any components having a height which exceeds the desired liquid fill height of the dispensed encapsulant material, and stopping the dispensing above such components. In a further version of the method, the step of defining a module region includes the step of dispensing the encapsulant in high-viscosity form.

What is claimed is:

1. A method for molding multichip modules allowing backside contact, said method comprising the steps of:

procuring a tensioned dielectric film populated with components having electrical contacts adjacent said film and also having at least one of a backside thermal contact and a backside electrical contact;

defining a module region by dispensing a high-viscosity liquid dam material around those components included within a single module;

filling at least a portion of the dammed region with liquid encapsulant material by use of an programmed automatic dispensing apparatus which relatively moves a dispenser tip along a preprogrammed path within the module region; and controlling said programmed automatic dispensing apparatus to define a dispensing path which dispenses said encapsulant material from above the surface of said dielectric film, and which (a) dispenses said liquid encapsulant material in a predefined overall pattern, so that, in the absence of components requiring backside contacts, the entirety of said dammed region is filled with encapsulant, (b) stops the dispensing in those regions occupied by those of said components for which backside contact is desired.

2. A method according to claim 1, wherein said controlling step includes a predefined spiral-out dispensing pattern.

3. A method according to claim 1, wherein said controlling step includes a predefined raster-scan dispensing pattern.

4. A method for molding multichip modules allowing backside contact, said method comprising the steps of:

procuring a tensioned dielectric film populated with components having electrical contacts adjacent said film and also having at least one of a backside thermal contact and a backside electrical contact;

defining a module region by dispensing a high-viscosity liquid dam material around those components included within a single module;

filling at least a portion of the dammed region with liquid encapsulant material by use of an programmed automatic dispensing apparatus which relatively moves a dispenser tip along a preprogrammed path within the module region; and controlling said programmed automatic dispensing apparatus to define a dispensing path which dispenses said encapsulant material from above the surface of said dielectric film, and which (a) dispenses said liquid encapsulant material in a predefined overall pattern, so that, in the absence of components requiring backside contacts, the entirety of said dammed region is filled with encapsulant, (b) stops the dispensing in those regions occupied by those of said components for which backside contact is desired, and wherein said controlling step further includes the step of raising said dispenser tip to clear components having heights which exceed a given level.

5. A method for molding multichip modules allowing backside contact, said method comprising the steps of:
  procuring a tensioned dielectric film populated with components having electrical contacts adjacent said film and also having at least one of a backside thermal contact and a backside electrical contact;
  defining a module region by dispensing a high-viscosity liquid dam material around those components included within a single module;
  filling at least a portion of the dammed region with liquid encapsulant material by use of an programmed automatic dispensing apparatus which relatively moves a dispenser tip along a preprogrammed path within the module region; and
  controlling said programmed automatic dispensing apparatus to define a dispensing path which dispenses said encapsulant material from above the surface of said dielectric film, and which (a) dispenses said liquid encapsulant material in a predefined overall pattern, so that, in the absence of components requiring backside contacts, the entirety of said dammed region is filled with encapsulant, (b) stops the dispensing in those regions occupied by those of said components for which backside contact is desired;
  wherein said step of defining a module region further comprises the step, within said module region, of damming off a portion of said module, and further comprising the step of, within said portion of said module, stopping the dispensing of said encapsulant.

6. A method according to claim 1, further comprising the step of separating said module from said populated dielectric in such a fashion that said dam defines exterior dimensions substantially equal to the finished size of said module.

7. A method according to claim 1, further comprising the step of separating said module from said populated dielectric; and
  trimming said dam in such a fashion that the finished exterior dimensions of said module are smaller than the exterior dimensions of said dam.

8. A method for molding multichip modules allowing backside contact, said method comprising the steps of:
  procuring a tensioned dielectric film populated with components having electrical contacts adjacent said film and also having at least one of a backside thermal contact and a backside electrical contact;
  defining a module region by dispensing a high-viscosity liquid dam material around those components included within a single module;
  filling at least a portion of the dammed region with liquid encapsulant material by use of an programmed automatic dispensing apparatus which relatively moves a dispenser tip along a preprogrammed path within the module region; and
  controlling said programmed automatic dispensing apparatus to define a dispensing path which dispenses said encapsulant material from above the surface of said dielectric film, and which (a) begins dispensing near the geometric center of the module region, and continues dispensing in a generally spiral overall pattern, so that, in the absence of components requiring backside contacts, the entirety of said dammed region is filled with encapsulant, (b) stops the dispensing in those regions occupied by those of said components for which backside contact is desired.

9. A method according to claim 8, wherein said method comprises the step of performing said dispensing from a dispenser tip which, during dispensing, maintains a fixed height above the desired encapsulant fill level.

10. A method for molding multichip modules allowing backside contact, said method comprising the steps of:
  procuring a tensioned dielectric film populated with components having electrical contacts adjacent said film and also having at least one of a backside thermal contact and a backside electrical contact;
  defining a module region by dispensing a high-viscosity liquid dam material around those components included within a single module;
  filling at least a portion of the dammed region with liquid encapsulant material by use of an programmed automatic dispensing apparatus which relatively moves a dispenser tip along a preprogrammed path within the module region; and controlling said programmed automatic dispensing apparatus to define a dispensing path which dispenses said encapsulant material from above the surface of said dielectric film, and which (a) begins dispensing near the geometric center of the module region, and continues dispensing in a generally spiral overall pattern, so that, in the absence of components requiring backside contacts, the entirety of said dammed region is filled with encapsulant, (b) stops the dispensing in those regions occupied by those of said components for which backside contact is desired, wherein said controlling step includes the further step of (c) raising said dispenser tip and stopping said dispensing to clear any components having a height which exceeds the height of said dispensed encapsulant material.

11. A method according to claim 8, wherein said step of defining a module region includes the step of dispensing said encapsulant in high-viscosity form.

12. A method for molding multichip modules allowing backside contact, said method comprising the steps of:
  procuring a tensioned dielectric film populated with components having electrical contacts adjacent said film and also having at least one of a backside thermal contact and a backside electrical contact;
  defining a module region by dispensing a high-viscosity liquid dam material around those components included within a single module;
  filling at least a portion of the dammed region with liquid encapsulant material by use of an programmed automatic dispensing apparatus which relatively moves a dispenser tip along a preprogrammed path within the module region; and
  controlling said programmed automatic dispensing apparatus to define a dispensing path which dispenses said encapsulant material from above the surface of said dielectric film, and which (a) begins dispensing near the geometric center of the module region, and continues dispensing in a generally spiral overall pattern, so that, in the absence of components requiring backside contacts, the entirety of said dammed region is filled with encapsulant, (b) stops the dispensing in those regions occupied by those of said components for which backside contact is desired;
  wherein said step of defining a module region includes the step of defining a further dammed region within said module region; and
  controlling said dispensing so as to leave said further dammed region empty of encapsulant.

13. A method according to claim 8, further comprising the step of separating said module from said tensioned, populated dielectric film in such a manner that the finished dimensions of said module are substantially equal to the exterior dimensions of said dammed region.

14. A method according to claim 8, further comprising the step of separating said module from said tensioned, populated dielectric film; and trimming said module in such a manner that the finished dimensions of said module are smaller than the exterior dimensions of said dammed region.

15. A method according to claim 1, wherein said controlling step includes a predefined rectangular-spiral dispensing pattern.

\* \* \* \* \*